United States Patent [19]

Saulters

[11] 4,172,494
[45] Oct. 30, 1979

[54] AIR TRANSFER SYSTEM FOR A VEHICLE-CAMPER OUTFIT

[76] Inventor: Cecil C. Saulters, 819 W. 27th St., Pueblo, Colo. 81001

[21] Appl. No.: 800,560

[22] Filed: May 25, 1977

[51] Int. Cl.² ............................................. B60H 3/04
[52] U.S. Cl. ...................................... 165/43; 62/244; 98/2.11; 237/12.3 R; 296/166
[58] Field of Search ............... 62/239, 244, 327; 98/7, 98/94 AC; 285/19, 20, 397, 158, 370; 296/23 MC; 237/12.3 B, 3 W, 12.3 R; 165/41–43

[56] References Cited

U.S. PATENT DOCUMENTS

| | | | |
|---|---|---|---|
| 3,211,076 | 10/1965 | Chancellor et al. | 62/244 |
| 3,280,896 | 10/1966 | Goodson et al. | 165/43 |
| 3,359,752 | 12/1967 | Westling et al. | 62/239 |
| 3,447,603 | 6/1969 | Jones | 285/158 |
| 3,656,541 | 4/1972 | Coyle et al. | 165/16 |
| 3,701,552 | 10/1972 | Cowan | 285/158 |
| 3,763,927 | 10/1973 | Stafford et al. | 165/23 |
| 3,855,814 | 12/1974 | Eubank | 62/239 |
| 3,900,224 | 8/1975 | Copeland | 296/23 MC |
| 4,057,269 | 11/1977 | Bislen | 285/58 |

Primary Examiner—Samuel Scott
Assistant Examiner—Theophil W. Streule, Jr.
Attorney, Agent, or Firm—Burton & Dorr

[57] ABSTRACT

An air transfer system for conveying air from the heater-air conditioner of a vehicle to the interior of an accessory such as a camper, trailer, and the like attached to the vehicle. The air transfer system includes a main conduit that is attached at one end to the air spreader of the heater-air conditioner of the vehicle to receive conditioned air therefrom. In one embodiment, the main conduit is positioned under or over the front seat of the vehicle and the other end of it passed through a hole in the back window of the vehicle and mounted to an adaptor positioned adjacent a hole in the front window of the camper. In two of the embodiments, the ends of the main conduit have collars that are slideably receivable within adaptors mounted to the air spreader and the window of either the vehicle of the camper. A third embodiment has a collar mounted around the main conduit adjacent its second end. The collar is slideably receivable about a raised portion on an adaptor mounted on the back window of the vehicle to position the actual end of the conduit adjacent the air inlet passage of the interior of the camper. The invention may include plug plates that can be easily placed over the holes in the windows of the camper and the vehicle when the air transfer system is not in use.

4 Claims, 11 Drawing Figures

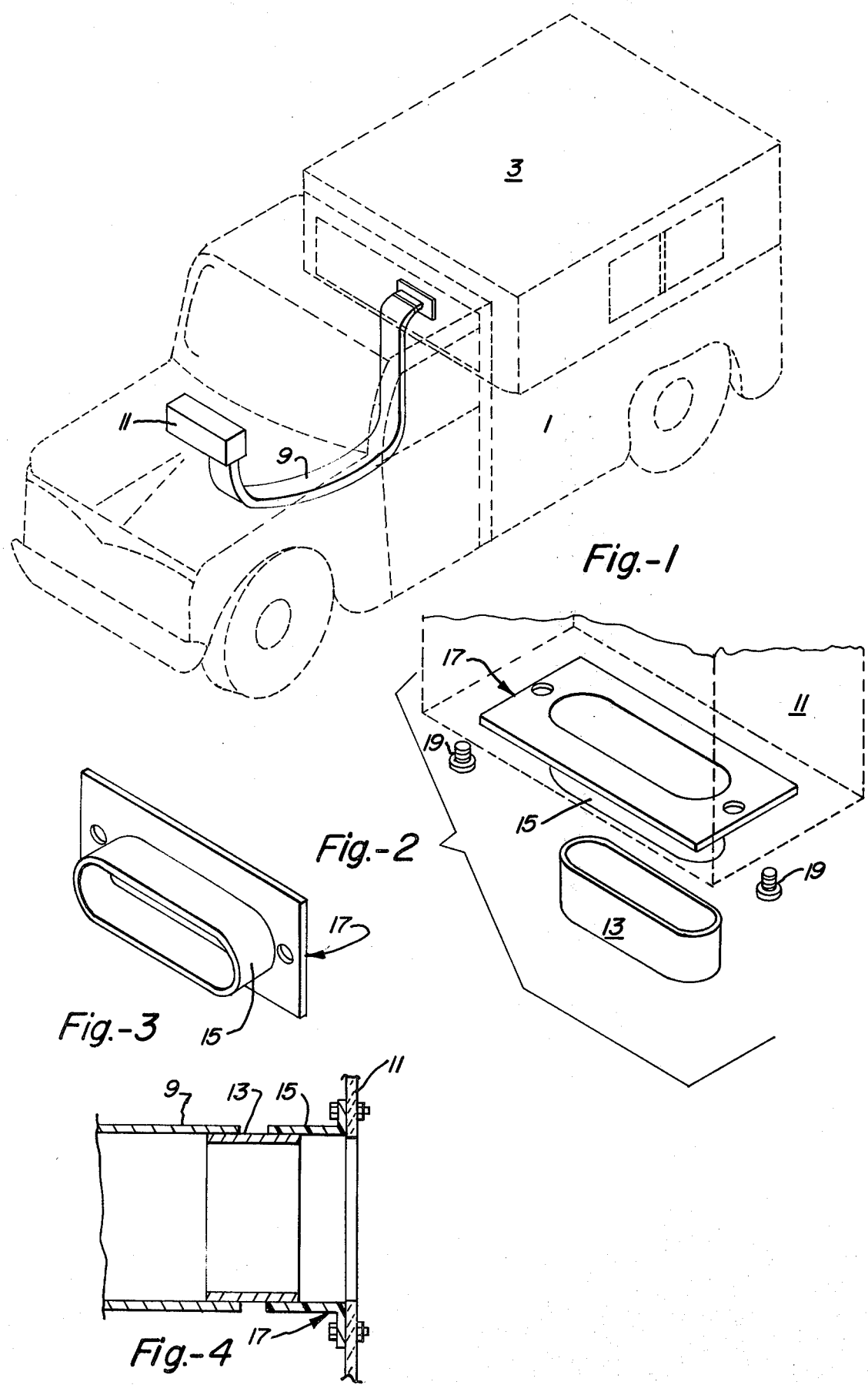

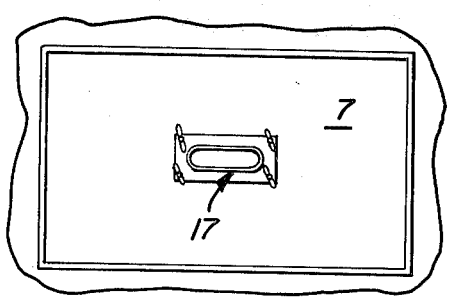
Fig.-8
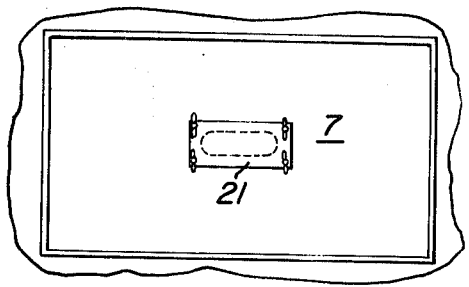
Fig.-9
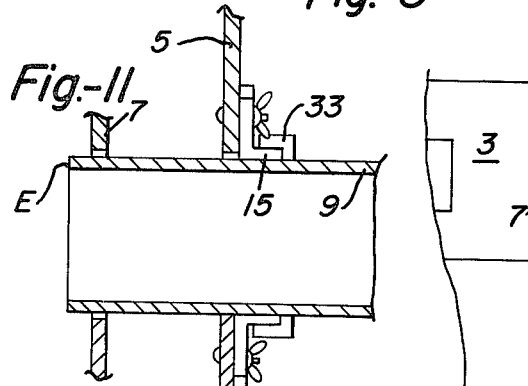
Fig.-11
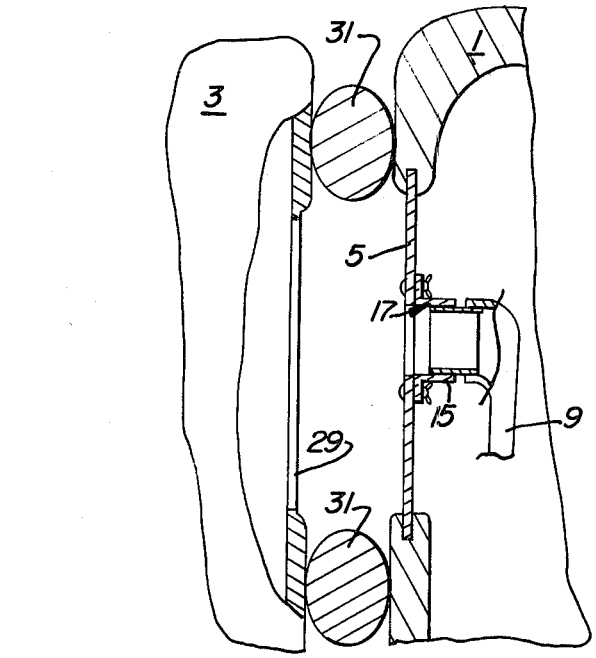
Fig.-5
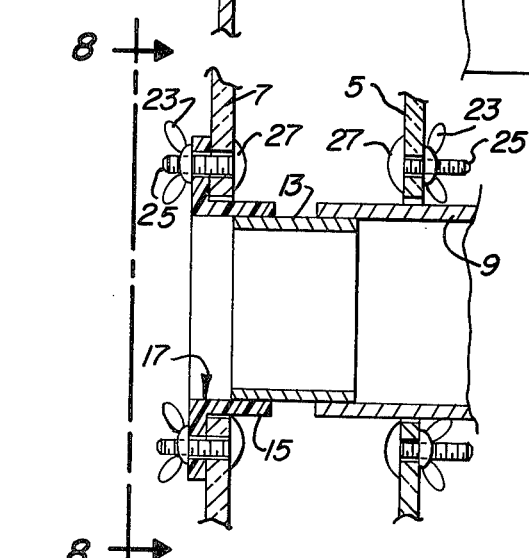
Fig.-6
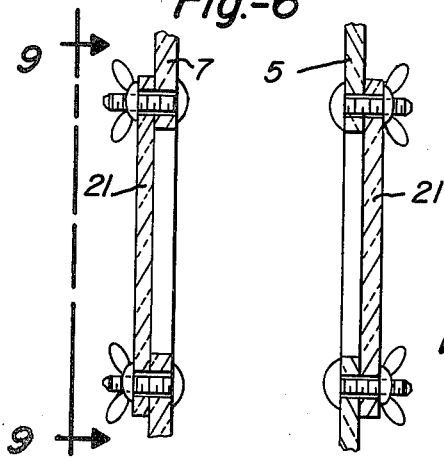
Fig.-7
Fig.-10

AIR TRANSFER SYSTEM FOR A VEHICLE-CAMPER OUTFIT

FIELD OF THE INVENTION

This invention relates to the field of systems for conditioning the air in a vehicle-camper, vehicle-trailer, and other vehicle-accessory outfits.

BACKGROUND OF THE INVENTION AND PRIOR ART

Most vehicles with accessories such as campers, trailers, and the like have separate and independent air systems for the vehicle and the accessory. The air conditioner and heater for the vehicle are generally powered by the vehicle's motor and deliver the heated or cooled air through an air spreader into the cabin of the vehicle. The air conditioner and heater for the accessory are usually not only completely independent from those of the vehicle but also completely independent from each other.

The design and operation of air conditioners and heaters for vehicles alone, such as cars and trucks, have been the subject of considerable effort and investment by truck and car builders. These systems have been developed to a fairly advanced state and work well to heat and cool the air within the cabin of the vehicle. In fact, most of these systems are capable of producing more than enough heated or cooled air to maintain a comfortable air temperature within the cabin of the vehicle. On the other hand, the design and operation of air conditioners and heaters for accessories such as campers, trailers, and the like have seriously lagged behind the technology of the corresponding systems found in the vehicle itself. The systems for the accessories are usually small, portable units that are incapable of maintaining a comfortable air temperature within the accessory. Many heaters for accessories are powered by 12-volt batteries, fuel oil, or fuel gas and are either incapable of producing enough heat for the accessory or incapable of satisfactorily circulating the heated air produced in order to maintain a fairly uniform, comfortable air temperature throughout the accessory. Some gas heaters are fully capable of producing enough heat for a camper or trailer; however, these units present a high fire risk and a high risk of asphyxiating the people within the camper or trailer.

The most widely used heaters for accessories such as campers, trailers, and the like are powered by fuel oil or fuel gas. Other popular heaters for accessories are electric and are powered by a 12-volt battery source. Oil or gas powered heaters produce a rather intense heat in the area immediately adjacent the heater and usually require a fan to distribute the heated air throughout the interior of the accessory. This presents the additional need to supply a power source for the fan as well as the accompanying problems of noise and reduction of the available space within the accessory. Even with a fan to circulate the heated air, the air temperature within the accessory is usually very uneven with some areas being too hot and other areas being too cold. Heaters powered by fuel oil or fuel gas also present grave risks of fire, burns, and asphyxiation if not operated properly. They are also difficult or impossible to regulate with a thermostat and the operator must either get up several times during the night to adjust the settings on the heater or else pick a particular setting and leave it there for the entire night. If the heater is left at one setting for the entire night, the air temperature within the accessory is usually too hot at one point of the night and too cold at another point in the night.

Like gas and oil heaters, electric heaters also present a risk of fire and burns. Further, they generally will not produce enough heat for medium-sized and larger campers and they will drain a 12-volt battery if used over an extended period of time. Electric heaters also have the problem of battery upkeep and failure. Battery failure is often unpredictable as well as being sudden and complete, leaving the operator with no heat source at all. As with fuel oil and fuel gas heaters, electric heaters using fans present the additional need to supply a power source for the fan as well as the accompanying problems of noise and reduction in the available space within the accessory.

Air conditioners for accessories such as campers, trailers, and the like are usually powered by either gas or electricity. Most electrically powered air conditioners require a 110-volt power source. It is usually impractical to provide a generator for such an electric air conditioner in the vehicle-accessory outfit and, as a result, the air conditioner can only be run when a 110-volt source is readily available as in a trailer park. Gas powered air conditioners are usually bulky, difficult to operate, and costly. Their size alone is a major drawback in that it greatly reduces the available space within the camper. If positioned outside the camper, they increase the air drag on the camper as it moves and are prone to theft and exposure to the elements.

The only known arrangement for using the heater and air conditioner of the vehicle to condition the air within the accessory involves the use of an inflated donut. In this arrangement, the back window of the vehicle and the front window of the camper are removed or slid open and an inflatable donut is placed around the windows and between the vehicle and the camper. Conditioned air from the vehicle's cabin then drifts back into the camper. This arrangement has proven to be most unsatisfactory. First, it is almost impossible to achieve an effective seal between the vehicle and the camper using a donut. The donut rarely makes a good seal between the vehicle and camper when the outfit is stationary, let alone when the vehicle-camper outfit moves over the road or ground. As the outfit is driven, the relative movement of the vehicle and camper makes it almost impossible to maintain a good seal with a donut. This relative movement of the vehicle and camper also produces a rubbing force on the donut and quickly wears it away and produces air gaps.

In addition to these problems with the use of a donut arrangement, there is the problem of circulating the air between the vehicle and the camper. The heater-air conditioner system of commercially available vehicles are only designed to circulate air within the cabin of the vehicle. As a result, the use of a donut arrangement ends up making the cabin too hot or too cold to bear while the air temperature within the camper is hardly changed.

No satisfactory air transfer system for using the heater-air conditioner system of a vehicle to directly heat or cool the air in an accessory such as a camper, trailer, and the like is known to be available. U.S. Pat. No. 1,936,062 to Masury issued on Nov. 21, 1933, diverts a portion of the hot exhaust gases from the vehicle's engine through pipes 29 and 30 into a heat exchanger or radiator 26 mounted in the accessory. A fan 31 blows the air in the accessory over this radiator in which the hot exhaust gases are passing. The air within the accessory forms a closed system and the hot exhaust gases never mix with it. Masury also has a separate and independent air cooler mounted within his accessory. U.S. Pat. No. 3,814,314 issued to Morden on June 4, 1974, and U.S. Pat. No. 3,868,060 issued to Mitchell on Feb. 25, 1975 both circulate the hot engine's coolant through lines in a closed system in which a portion of the closed system passes into the interior of the camper where a fan blows air over that portion of the system. In a manner similar to the teachings of Morden and Mitchell, Anderson in U.S. Pat. No. 3,381,316 issued on May 7, 1968 circulates his hot engine's coolant in a closed system in which a portion of the system passes through the shower water in the camper. Hot coolant from the engine of Anderson's vehicle is passed through the closed system consisting of lines 27, 29 and 35. Line 29 is a heat transfer coil that heats the water 33 in the shower system of the camper.

None of the above-cited U.S. Patents discloses an air transfer system for using the heater-air conditioner system of a vehicle to directly heat or cool the air in an accessory such as a camper, trailer, and the like attached to the vehicle.

The ideal air transfer system for a vehicle-accessory outfit would place the air within the accessory in direct fluid communication with the heater-air conditioner system of the vehicle. It would be safe, inexpensive, and easily installable in commercially available vehicle-accessory outfits. Further, the ideal air transfer system for a vehicle-accessory outfit would quickly and efficiently condition and maintain the air within the accessory at a comfortable temperature without increasing or decreasing the temperature within the cabin of the vehicle beyond a comfortable range. The air transfer system of the present invention provides such a system.

SUMMARY OF THE INVENTION

This invention involves an air transfer system for conveying conditioned air from a heater-air conditioner system of a vehicle to the interior of an accessory such as a camper, trailer, and the like attached to the vehicle. In one embodiment, a conduit is placed within the cabin of the vehicle with one end portion thereof removeably connected to the air spreader of the heater-air conditioner system of the vehicle. The conduit extends through the cabin of the vehicle and out the back window where the other end portion of the conduit is removeably connected to the accessory over an air inlet passage therein. In a second embodiment, the accessory is attached to the vehicle so that its air inlet passage is positioned immediately adjacent the back window of the vehicle. In this embodiment, the back window of the vehicle has an air outlet passage and the second end portion of the conduit is removeably connected over this outlet passage. In a third embodiment, one end portion of the conduit extends through the back window of the vehicle and is removeably connected to the back window to support the actual end of the conduit within the air inlet passage of the accessory. In all embodiments, the air from the heater-air conditioner is conveyed through the conduit either directly into the interior of the accessory or to a position immediately adjacent the air inlet passage of the accessory.

The air transfer system includes adaptors that can be removeably mounted over the air outlet of the heater-air conditioner of the vehicle and over the air inlet passage to the accessory or the air outlet passage from the vehicle. Each adaptor has a passage through it and a raised portion extending substantially about the passage for slideably receiving an end portion of the conduit. In two of the embodiments, each end portion of the conduit has a collar that corresponds to the shape of the raised portion on the adaptor and which is slideably receivable therewithin. In the third embodiment, the collar is positioned about the conduit and is slideably received about the raised portion of the adaptor. The invention may include plug plates which can be placed over the air inlet passage of the accessory and the air outlet passage of the vehicle when the air transfer system is not being used. All the embodiments are readily adaptable and easily installable in commercially available vehicle-accessory outfits.

OBJECTS OF THE INVENTION

It is an object of this invention to provide a new and novel air transfer system between a vehicle and the interior of an accessory such as a camper, trailer, and the like attached to the vehicle.

It is an object of this invention to provide a new and novel air transfer system for quickly and safely modifying the air temperature within an accessory such as a camper, trailer, and the like using the heater-air conditioner system of the vehicle to which the accessory is attached.

Another object of this invention is to provide a new and novel system for placing the interior of a camper, trailer, and the like in fluid communication with the heater or air conditioner of the vehicle to which it is attached.

It is also an object of this invention to provide a new and novel air transfer system between a vehicle and an accessory, which system is inexpensive and easily installable in commercially available vehicle-accessory outfits.

It is also an object of this invention to provide a new and novel system for maintaining the air within a camper, trailer, and the like at a comfortable temperature without increasing or decreasing the temperature within the cabin of the vehicle beyond a comfortable range.

Additional objects as well as features and advantages of this invention will become evident from the descriptions set forth hereinafter when considered in conjunction with the following drawings.

BRIEF DESCRIPTION OF THE DRAWINGS

FIG. 1 is a perspective view showing the invention in use in a vehicle-camper outfit.

FIG. 2 is an exploded view of the manner in which one end of the conduit of the air transfer system is removably attachable to an adaptor mounted on the air spreader of the heater-air conditioner of the vehicle.

FIG. 3 illustrates the adaptor that can be attached to the air spreader of the vehicle to slideably receive one end of the conduit of the air transfer system. The adaptor illustrated in FIG. 3 can also be attached to the back window of the vehicle or the front window of the camper in order to slideably receive the other end of the conduit of the air transfer system.

FIG. 4 illustrates an embodiment in which each end of the conduit has a collar that is slideably received within the adaptor to form a substantially air tight seal.

FIG. 5 shows a manner of positioning the conduit of the air transfer system within the cabin of the vehicle. In this embodiment, one end of the conduit is connected to the air spreader within the cabin of the vehicle and the other end is passed through a hole in the back window of the vehicle and slideably attached to an adaptor positioned on the window of the camper.

FIG. 6 shows the manner in which one end portion of the conduit passes through a hole in the back window of the cabin of the vehicle and is slideably received within an adaptor that is mounted to the window of the camper.

FIG. 7 illustrates the manner in which the hole in the back window of the cabin of the vehicle and the front window of the camper are sealed or plugged by plates when not in use.

FIG. 8 is a view along line 8—8 of FIG. 6 showing the adaptor which is removably attached to the window of the camper.

FIG. 9 is a view along line 9—9 of FIG. 7 showing a plug plate that is positioned over the hole in the window of the camper when the air transfer system is not in use.

FIG. 10 illustrates a modification of the invention in which one end of the conduit of the air transfer system is slideably received within an adaptor mounted on the back window of the vehicle. In this embodiment, the air passage into the camper through the front window can be opened to receive the conditioned air. If desired, an inflatable donut can be put between the vehicle and the camper for a better air transfer.

FIG. 11 shows another embodiment of the invention in which one end portion of the conduit has a collar positioned around it which is slideably receivable about an adaptor that is mounted to the back window of the vehicle. In this embodiment, the actual end of the conduit is supported in or near the air passage of the camper.

DETAILED DESCRIPTION OF THE PREFERRED EMBODIMENT

FIGS. 1 and 5 best illustrate the air transfer system of the present invention in use in a vehicle-camper outfit. The vehicle 1 has a camper 3 attached to it so that the back window 5 of the vehicle 1 and the front window 7 of the camper 3 are positioned adjacent one another. The air transfer system includes a main conduit 9 that can be attached at one end to the air spreader 11 within the vehicle 1. The other end of the main conduit 9 extends through a hole or air outlet passage in the back window 5 of the vehicle's cabin and is supported adjacent a hole or air inlet passage in the front window 7 of the camper 3. The air spreader 11 is part of a unit that delivers conditioned air into the cabin of the vehicle 1. This unit or air modifying means can be a heater, cooler, air conditioner, vent system, humidifier, combinations of these, and the like. It can have its own source of power or can be powered by the vehicle's motor or electrical system. Such air modifying units usually include a fan to force the air into the cabin through the air spreader 11 and a thermostat to control the temperature of the air. The air transfer system of the present invention is easily adaptable to all commercially available units.

In one embodiment of the invention as shown in FIGS. 2-6, each end portion of the main conduit 9 of the air transfer system has a collar 13 that is slideably received within the raised portion 15 of adaptors 17 mounted to the air spreader 11 and the front window 7 of the camper 3. As best seen in FIGS. 2-4, an adaptor 17 can be easily mounted to the air spreader 11 by screws 19. In most vehicles, there is an air shoe on the air spreader that can be easily removed and the adaptor 17 mounted in its place. A second adaptor 17 is mounted to the front window 7 of the camper 3 as shown in FIGS. 5 and 6 to slideably receive the collar 13 on the other end of the main conduit 9.

When the air transfer system is not in use, plug plates 21 are placed over the holes in the windows 5 and 7 as illustrated in FIGS. 7 and 9. For theft prevention and easy manipulation, the plug plates 21 are mounted over the holes with a wing nut 23 and screw 25 arrangement. The heads 27 of the screws 25 are preferably smooth and mounted in a tight fitting relationship in the windows 5 and 7. The wing nuts 23 face inwardly of the cabin window 5 and the camper window 7 respectively to prevent access thereto from the outside.

FIG. 10 illustrates an embodiment of the invention in which one end of the conduit 9 is mounted to an adaptor 17 and positioned on the back window 5 of the vehicle 1. The conditioned air in the conduit 9 passes into the interior of the camper 3 through the open, sliding window 29. If properly aligned, the conditioned air could also pass into the camper 3 through a hole in the front window of the camper 3. An inflatable donut 31 can also be placed between the vehicle 1 and the camper 3 to enhance the transfer of conditioned air from the air modifying means of the vehicle to the interior of the camper 3.

In the embodiment of FIG. 11, a collar 33 is positioned about one end portion of the conduit 9 away from the actual end E of the main conduit 9. An adaptor 17 is mounted to the back window 5 of the vehicle 1 and the end portion of the main conduit 9 is extended through the hole in the back window 5 to place the collar 33 in a mating relationship about the raised portion 15 of the adaptor 17. In this embodiment, the end portion of the main conduit 9 is supported on the back window 5 of the vehicle 1 to position the actual end E of the main conduit 9 in or near the hole in the front window 7 of the camper 3.

In the embodiment of FIGS. 1-11, the windows 5 and 7 are preferably made of plexiglass or other similar material. The adaptors 17 can be removably mounted to the windows 5 and 7 or if the windows 5, 7, or 29 having sliding segments, they can be positioned between the sliding segments thereof. The collars 13 of the main conduit 9 can be made as an integral unit of the main conduit 9 and the ends of the main conduit 9 can be mounted to the air spreader 11 and windows 5 and 7 in any convenient manner. In the preferred embodiment of the invention, collars 13 and 33 are slideably received in a frictional grip within or about the raised portion 15 of the adaptors 17 to form a substantially airtight seal. The collars 13 and 33 as well as the adaptor 17 can be made of metal, plastic, rubber, and the like. One end of main conduit 9 is shown as being mounted to receive conditioned air from the air spreader 11, however, it is contemplated that one end of the main conduit 9 could be mounted in any number of positions to receive conditioned air from the heater, cooler, vent system, humidifier, or other air modifying means mounted in or on the vehicle 1. The main conduit 9 can have any desired cross-sectional shape and can be placed over or under the front seat 35. For occassional use, the main conduit 9 can be quickly and easily connected at each end with the main body thereof draped over the front seat 35 rather than under it.

The accessory attached to vehicle 1 can also be a trailer or other towed or mounted component. The main conduit 9 can be passed through the back window, side window, or other part of the vehicle 1 and can be received through a window or other part of the camper 3. Campers without front windows could be modified to include a window or the end of the main conduit 9 could be received through a hole in the side, floor or roof of the camper.

While several embodiments of the present invention have been described in detail herein, various changes and modifications can be made without departing from the scope of the invention.

I claim:

1. An air transfer system to be used in combination with a vehicle and an accessory such as a camper attached to said vehicle for conveying conditioned air directly from an air modifying means in the cabin of the vehicle to the interior of the accessory, said air modifying means having an air spreader means defining an air outlet from said air modifying means and further having means for forcing the conditioned air through said air outlet, said vehicle having an air outlet passage spaced from said air spreader means of said air modifying means and said accessory having an air inlet passage, said vehicle and said accessory being attachable to each other to position the air outlet passage of said vehicle adjacent the air inlet passage of said accessory, conduit means having first and second end portions, adapter means for attaching said first end portion of said conduit means to said air spreader means with said first end portion in fluid communication with the air outlet defined by said air spreader means, and, means for positioning said second end portion of said conduit adjacent said air inlet passage of said accessory to place said conduit means in direct fluid communication with the interior of said accessory whereby conditioned air from said air modifying means of said vehicle is moved by said forcing means of said air modifying means out of said air outlet of said air spreader means into and through said conduit means to the interior of said accessory.

2. The air transfer system of claim 1 wherein said positioning means includes an adapter means and means for mounting said adapter means about said air inlet passage of said accessory, said second end portion of said conduit means being attached in a fluid-tight mating relationship to said adaptor means whereby said second end portion can be passed through said air outlet passage of said vehicle and attached to said adaptor means to place said air modifying means of said vehicle in direct fluid communication through said conduit means with the interior of said accessory.

3. The air transfer system of claim 1 wherein said positioning means includes first means mounted about said conduit means adjacent said second end portion, adaptor means, and, means for mounting said adaptor means about said air outlet passage of said vehicle, said first means being attached in a fluid-tight mating relationship to said adaptor means with the second end portion of said conduit means extending through said air outlet passage of said vehicle and positioned adjacent said air inlet passage of said accessory to place said air modifying means of said vehicle in direct fluid communication through said conduit means with the interior of said accessory.

4. The air transfer system of claim 1 further including a first and second plug means, means to mount said first plug means over the air outlet passage of said vehicle, and means to mount said second plug means over the air inlet passage of said accessory whereby said second end portion of said conduit means can be removed from adjacent said air inlet passage of said accessory and said air outlet passage of said vehicle so that said first and second plug means can be mounted over the respective air outlet passage of said vehicle and air inlet passage of said accessory.

* * * * *